(12) United States Patent
LeMasson

(10) Patent No.: US 7,759,608 B2
(45) Date of Patent: Jul. 20, 2010

(54) SLAT FOR LASER-CUTTING MACHINE TABLE

(75) Inventor: Gilles LeMasson, Montaigu (FR)

(73) Assignee: Lectra SA (FR)

( * ) Notice: Subject to any disclaimer, the term of this patent is extended or adjusted under 35 U.S.C. 154(b) by 285 days.

(21) Appl. No.: 10/507,051

(22) PCT Filed: Dec. 29, 2003

(86) PCT No.: PCT/FR03/03930

§ 371 (c)(1),
(2), (4) Date: Sep. 9, 2004

(87) PCT Pub. No.: WO2004/065056

PCT Pub. Date: Aug. 5, 2004

(65) Prior Publication Data

US 2005/0116396 A1 Jun. 2, 2005

(30) Foreign Application Priority Data

Jan. 9, 2003 (FR) .................................. 03 00193

(51) Int. Cl.
B23K 26/02 (2006.01)
(52) U.S. Cl. .......................... 219/121.82; 219/121.67; 219/121.68
(58) Field of Classification Search ............. 219/121.82, 219/121.67, 121.68, 121.69, 121.6, 121.72
See application file for complete search history.

(56) References Cited

U.S. PATENT DOCUMENTS

| | | | | |
|---|---|---|---|---|
| 3,828,159 A | * | 8/1974 | Zoot | 219/121.72 |
| 4,058,299 A | * | 11/1977 | Lindkvist | 266/48 |
| 4,112,797 A | * | 9/1978 | Pearl | 83/177 |
| 4,441,934 A | * | 4/1984 | Kawakami | 219/121.44 |
| 4,615,510 A | * | 10/1986 | Lehmler et al. | 266/48 |
| 5,167,903 A | * | 12/1992 | Anderson | 266/49 |
| 5,227,606 A | * | 7/1993 | Weeks et al. | 219/121.67 |
| 5,435,525 A | * | 7/1995 | Roy et al. | 266/49 |
| 5,481,083 A | * | 1/1996 | Smyth, Jr. | 219/121.67 |
| 5,560,887 A | * | 10/1996 | Roy et al. | 266/49 |
| 5,637,243 A | * | 6/1997 | Sato et al. | 219/121.67 |
| 5,756,961 A | * | 5/1998 | Sato et al. | 219/121.67 |
| 6,128,546 A | * | 10/2000 | Basista et al. | 700/166 |
| 6,222,155 B1 | * | 4/2001 | Blackmon et al. | 219/121.39 |

(Continued)

FOREIGN PATENT DOCUMENTS

DE 299 16 400 U1 12/1999

(Continued)

Primary Examiner—M. Alexandra Elve
(74) Attorney, Agent, or Firm—Smith, Gambrell & Russell

(57) ABSTRACT

The invention relates to the general field of cutting machines using a laser beam; it relates more particularly to a system of slats for a laser-cutting machine table. These slats (8) each consist of a trough (9) containing a plurality of juxtaposed inserts (10) arranged parallel or substantially parallel to one another, each insert (10) taking the form of a folded thin sheet-metal plate comprising at least two parts connected along a fold line, a first part arranged substantially parallel to the direction of incidence of the laser beam and constituting a support strip whose free upper edge forms a support element for the product (4) to be cut, and a second part which is inclined with respect to the direction of incidence of the laser beam and constitutes an oblique strip for deflecting the laser beam (3).

10 Claims, 3 Drawing Sheets

U.S. PATENT DOCUMENTS 6,609,044 B1 * 8/2003 Basista et al. ................ 700/166
6,727,457 B1 * 4/2004 Vande Berg ............ 219/121.58

FOREIGN PATENT DOCUMENTS

| FR | 2 586 607 A | | 3/1987 |
|----|----|----|----|
| GB | 1 391 080 A | | 4/1975 |
| GB | 1391080 | * | 4/1975 |
| JP | 08-108291 A | | 4/1996 |
| JP | 11058062 A | * | 3/1999 |
| WO | WO 97/07903 | | 3/1997 |

* cited by examiner

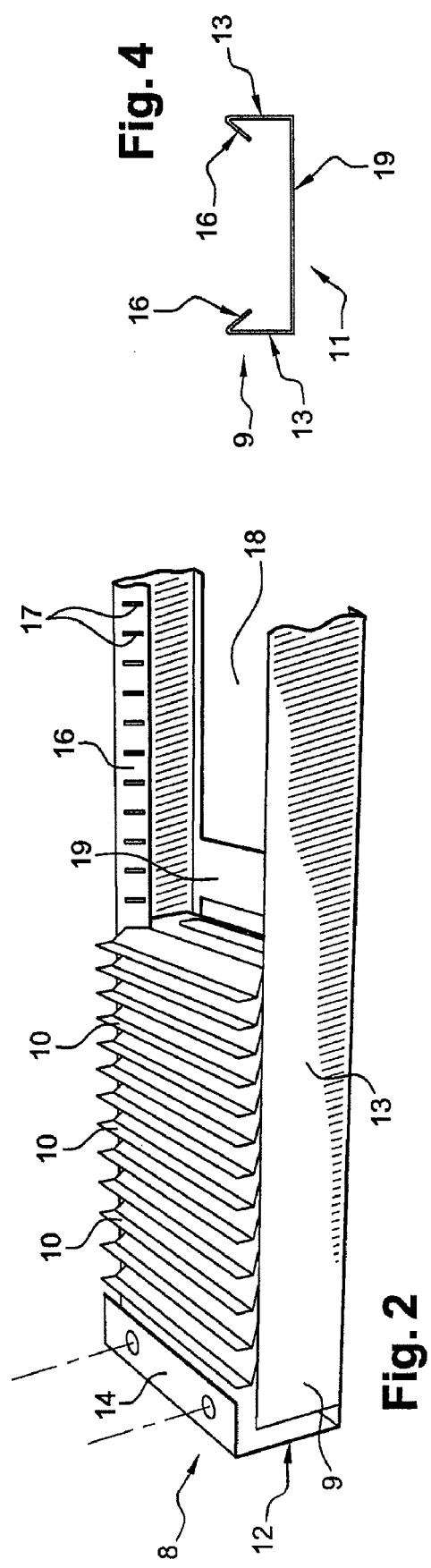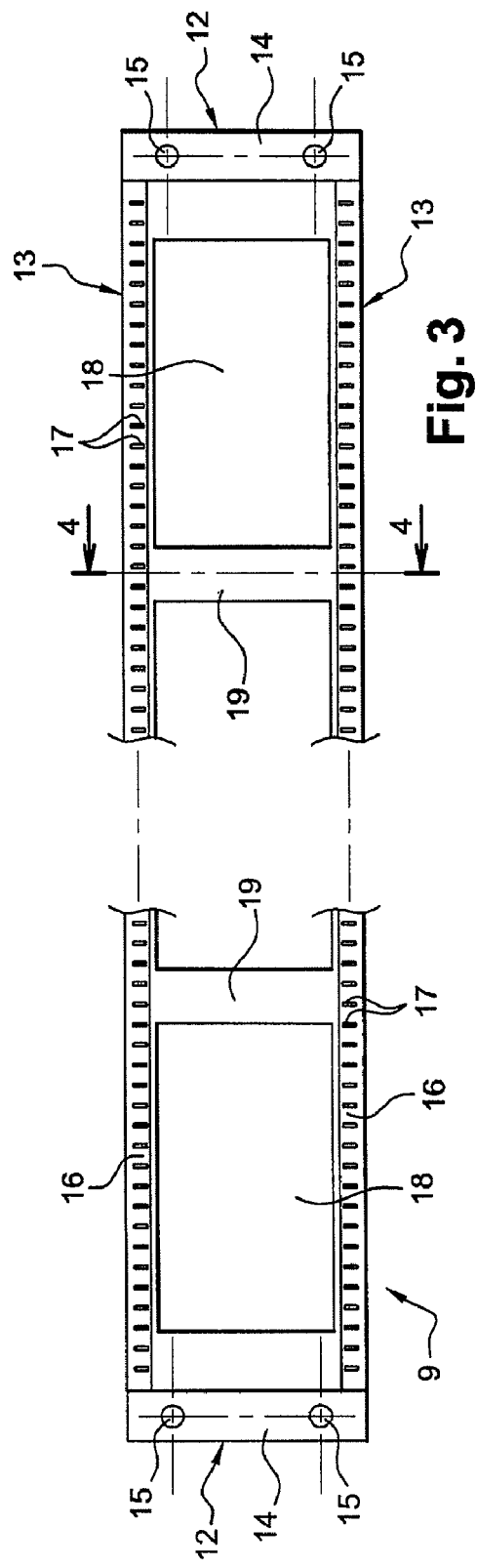

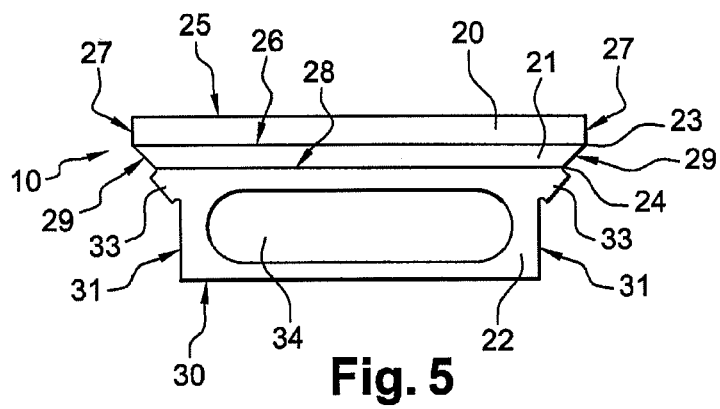 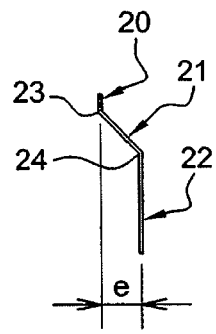
Fig. 5    Fig. 6
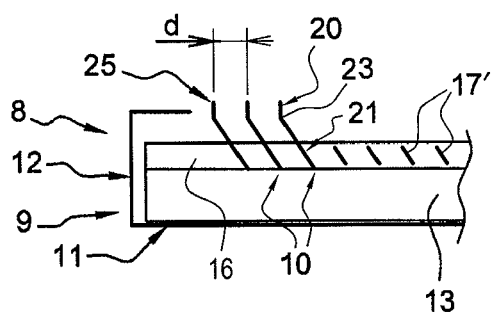 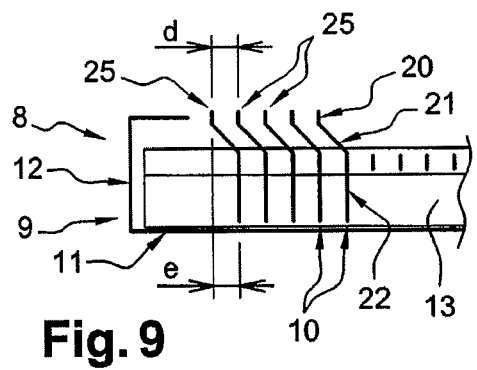
Fig. 10    Fig. 9
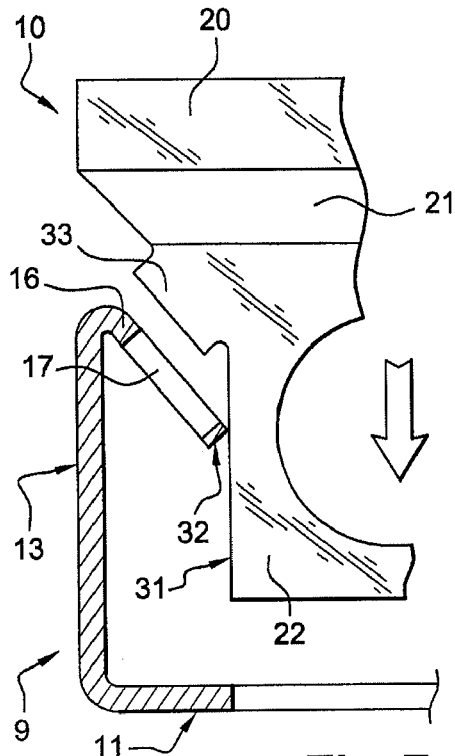 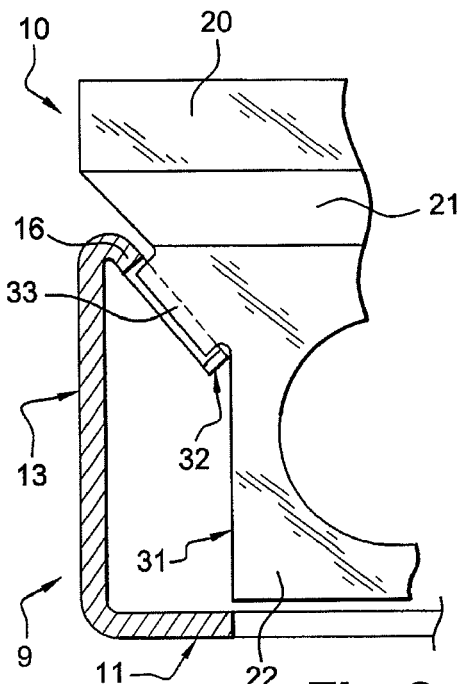
Fig. 7    Fig. 8

SLAT FOR LASER-CUTTING MACHINE TABLE

BACKGROUND OF THE INVENTION

The present invention relates to the general field of machines for cutting paper, board, thin wood, woven industrial fabric with or without a coating, leather or other materials using a laser beam; it relates more particularly to a slat system for a depositing table of a laser-cutting machine.

Laser-cutting machines are generally used for the precision cutting of complex shapes into products in sheet or plate form. These machines generally consist of a table on which the product to be cut is deposited and of a device for generating a laser beam.

Although the laser device is an essential element in these machines, the table on which the product is deposited is also a key element for obtaining quality cutting of the product of interest. Specifically, this table must support the product to be cut and have sufficient resistance to impingement by the laser beam while at the same time providing effective heat dissipation.

Currently, some tables for receiving the product to be cut are formed by a juxtaposition of slats whose upper surface is intended to support the product during cutting; the entirety of the juxtaposed slats forms the plane on which the product to be cut is deposited.

This upper surface may have a honeycomb-type structure. However, this honeycomb profile may prove difficult to clean. Furthermore, in the event of damage, the slat must be replaced in its entirety. Also, this honeycomb structure does not form a true obstacle to the progression of the laser beam, and this may cause problems in terms of damage to the underlying equipment, thus requiring the presence of an add-on element to deviate the said laser beam.

Also known from the abstract of Patent JP 08 108291 is a cutting table formed by a juxtaposition of plates which are inclined with respect to the direction of the laser beam in order to allow deflection of the beam between two adjacent plates.

The aim of this inclined arrangement of the plates is to attenuate the energy of the laser beam as it passes through the table. However, the impact of the laser beam on the inclined plates may pollute and damage the product to be cut.

OBJECT AND SUMMARY OF THE INVENTION

The present invention aims to overcome these drawbacks by proposing a slat consisting of a trough containing a plurality of juxtaposed inserts arranged parallel or substantially parallel to one another. According to the invention, each insert takes the form of a folded thin sheet-metal plate comprising at least two parts connected along a fold line, a first part arranged substantially parallel to the direction of incidence of the laser beam and constituting a support strip whose free upper edge forms a support element for the product to be cut, and a second part which is inclined with respect to the direction of incidence of the laser beam and constitutes an oblique strip for deflecting the laser beam.

Consequently, the support strip of the inserts makes it possible to distance the supported product from the impact of the laser beam on the oblique strip, thus limiting the effects of possible pollution of or damage to the product.

The support strip of the inserts also provides the slats with better mechanical strength for supporting the product to be cut and facilitates removal of the cut product by allowing a comb to be used for unloading.

The slat according to the present invention thus has a simple structure and is easy to manufacture; moreover, it is easy to clean, especially by means of a rotating brush.

According to one embodiment of the invention, each insert additionally comprises a third part, which is substantially parallel to the first part and forms a heel connected to the oblique strip along another fold line.

In this embodiment, the distance separating the plane of the support strip and the plane of the heel is advantageously greater than or equal to the distance between two juxtaposed inserts of the same trough. Consequently, the laser beam passing between two inserts is necessarily deviated by an oblique strip.

According to another particular feature, the inserts are fastened to the support trough via means which allow them to be disassembled. It is then possible to replace the inserts independently of one another and thus to replace only those inserts which have been damaged, in particular by the laser beam, mechanical impacts or other agents.

The slat then advantageously comprises a trough having in particular two lateral walls whose upper ends are folded inwards forming oblique folds provided over their whole length with a plurality of openings or slots. Two mutually opposite openings accommodate the lugs of complementary shape formed on the side edges of the inserts. The assembly of the lugs in the corresponding openings then takes place elastically and by clipping.

The slat may consist of inserts having a material void over a maximum area compatible with maintaining the rigidity of the said inserts. This void makes it possible in particular to significantly reduce the weight of each insert, and consequently the weight of the slat in its entirety, but also to improve heat dissipation by allowing air or another agent to circulate within the said slats.

The subject of the present invention is also an insert intended for a slat as defined above.

The subject of the present invention is additionally a laser-cutting machine table consisting of a plurality of juxtaposed slats as defined above.

BRIEF DESCRIPTION OF THE DRAWINGS

The invention is also illustrated by a specific embodiment, given solely by way of example, described below and represented in the appended drawings which follow:

FIG. 2 is a partial perspective view of a slat according to the invention for a laser-cutting table such as that represented in FIG. 1;

FIG. 3 is a view from above of the trough-shaped element of the slat as represented in FIG. 2;

FIG. 4 is a view in section on 4-4 of FIG. 3;

FIG. 5 is a front view of an insert according to the invention, isolated from the trough-shaped element;

FIG. 6 is a side view of the insert represented in FIG. 5;

FIG. 7 is a partial front view of an insert prior to clipping onto the receiving trough;

FIG. 8 is a partial front view of an insert clipped onto the receiving trough;

FIG. 9 is a schematic representation of a longitudinal section of the trough containing a plurality of clipped-on inserts; and FIG. 10 is a schematic representation of a longitudinal section of the trough containing a plurality of clipped-on inserts according to a variant embodiment of the invention.

DETAILED DESCRIPTION OF AN EMBODIMENT

Figure 1:
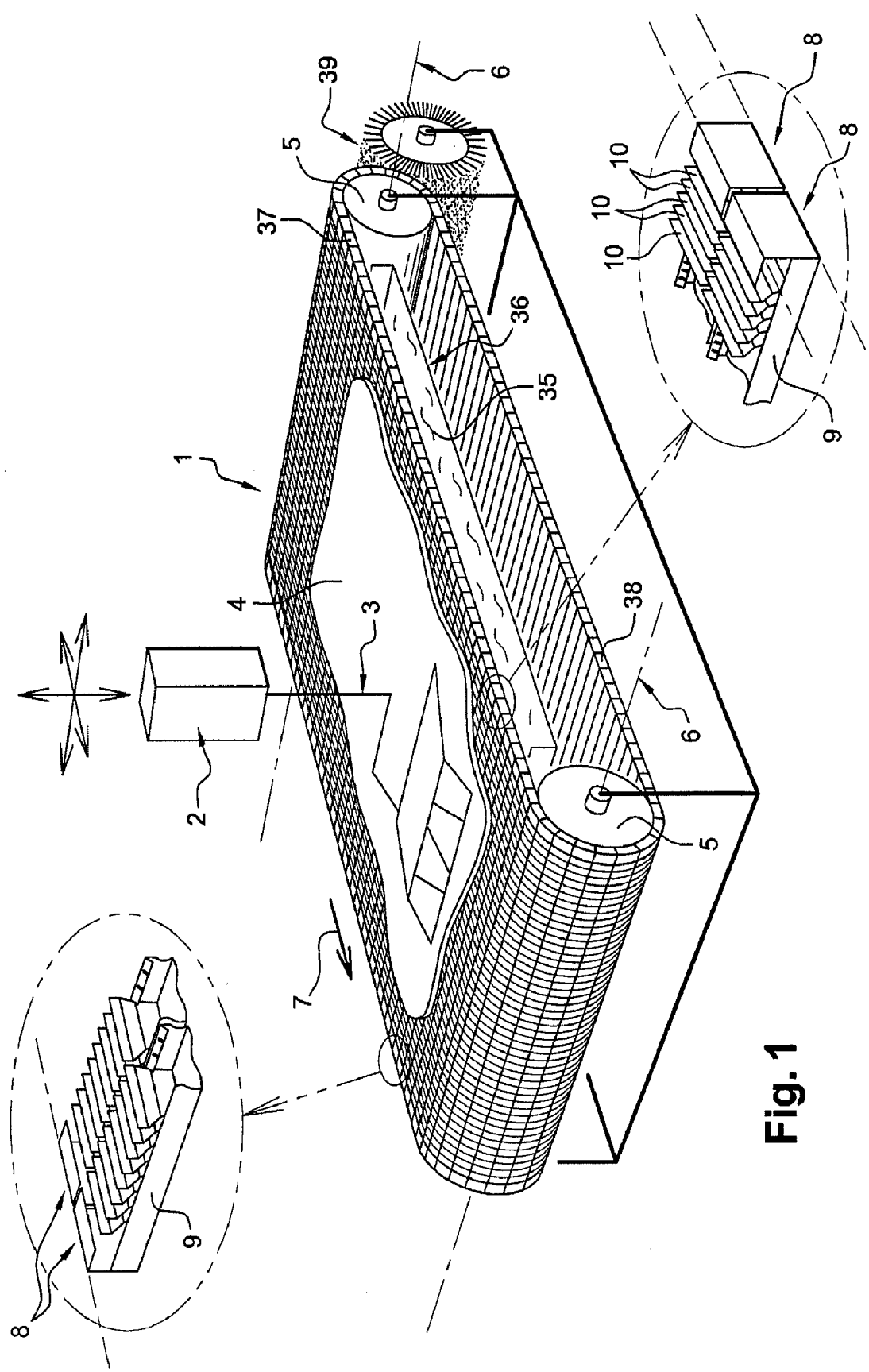
FIG. 1 is a highly schematic perspective representation of a laser-cutting machine provided with slats according to the present invention.

FIG. 1 represents a laser-cutting machine consisting mainly of a moving table 1, of the endless conveyor type, and of a gantry 2 provided with a system for generating a laser beam 3 intended to allow cutting of a material 4 arranged on the depositing plane formed by the table 1.

The gantry 2 is arranged vertically with respect to the table 1. This gantry 2 is provided with a conventional laser system for producing the laser beam 3. The direction of incidence of the beam 3 is preferably perpendicular to the depositing plane formed by the table 1. The gantry 2 can move in three directions in order to allow displacement of the beam 3 and thus produce the various shapes to be cut.

The table 1, as represented in FIG. 1, is of the endless conveyor type with an oblong longitudinal section.

This table 1 is supported by two rollers 5 with a horizontal axis 6; the two axes 6 are parallel to one another; one of the rollers 5 is motorized in order to drive the endless conveyor 1, for example in the direction of the directional arrow 7. The rollers 5 are supported at their ends by a chassis structure.

According to a variant embodiment of the invention, the table may also be of the stationary type.

This table 1 consists of a plurality of slats 8 juxtaposed transversely with respect to the direction of movement 7, parallel to the axis 6 of the rollers 5.

As represented in FIGS. 1 and 2, each slat 8 consists of a trough 9 (FIGS. 2 to 4) containing a plurality of juxtaposed inserts 10 which are parallel to one another (FIGS. 5 and 6). The elements 9, 10 may be made of steel or of aluminium.

The trough 9 (FIGS. 2 to 4), structural element of the slat 8, consists of a planar bottom element 11 bordered by two end walls 12 and by two side walls 13. The end walls 12 have a generally rectangular shape, the upper part 14 of which is folded over at a right angle.

This fold 14 is provided with two orifices 15 for fastening each of the ends of the said slats 8 to the device for driving the endless conveyor, for example of the flexible drive belt type.

The lateral walls 13, likewise of generally rectangular shape, have an upper part 16 folded over towards the inside of the trough 9 so as to form an oblique fold extending over the whole length of the said lateral wall 13.

Each oblique fold 16 is provided over its whole length with a plurality of uniformly distributed openings or slots 17, 17' having a generally rectangular shape extending transversely with respect to the said oblique fold 16.

The bottom element 11 has openings 18 which are separated by cross-pieces 19 contributing to the rigidity of the assembly.

According to one embodiment of the invention represented by FIGS. 5 and 6, each insert 10 takes the form of a polyhedral thin sheet-metal plate comprising three planar parts 20, 21, 22, which parts are connected by two fold lines 23 and 24 in such a way as to form a baffle.

The three planar parts 20, 21, 22 of the insert 10 are more precisely: a first part constituting an upper support strip 20; a second part constituting an intermediate oblique strip 21; and a third part constituting a lower heel 22. The plane of the support strip 20 and the plane of the heel 22 are substantially parallel to one another and spaced apart by a distance e by way of the oblique strip 21.

This shape of the insert 10 allows deviation of the laser beam 3 onto the oblique strip 21, which particularly prevents the beam from being reflected towards the cut material 4.

The support strip 20, of generally rectangular shape, is arranged substantially parallel to the direction of incidence of the laser beam. It is delimited by an upper end edge 25, a lower end edge 26 and two side edges 27.

The upper end edge 25 of the support strip 20 forms part of the plane on which the product is deposited; the upper edges 25 of the entirety of the inserts 10 of the slats 8 in the same plane form the surface on which the product is deposited.

The lower end edge 26 of the support strip 20 is connected to the oblique strip 21 by the fold line 23.

The distance between the two side edges 27 is equal to or substantially equal to the distance between the two outer surfaces of the lateral walls 13 of the trough 9. This characteristic makes it possible in particular to provide optimum support for the product to be cut.

Furthermore, the support strip 20 of the inserts 10 of the slats 8 makes it possible to distance the cut material 4 from the impact of the laser beam on the oblique strip 21, thus limiting the effects of possible pollution of or damage to the material.

The support strip 20, which is perpendicular to the depositing plane for the material 4 to be cut, also provides the slats 8 with better mechanical strength for supporting the material. The support strip 20 allows a comb to be employed for unloading.

The oblique strip 21, of generally trapezoidal shape, is delimited by two end edges 26, 28 and by two side edges 29.

This oblique strip 21 is connected at its upper end edge 26 to the support strip 20 by the fold line 23 at an angle of, for example, 135°; also, it is connected at its lower end edge 28 to the heel 22 by the fold line 24 likewise at an angle of, for example, 135°.

The side edges 29 of the oblique strip 21 have a profile allowing partial mating with the upper surface of the oblique folds 16 of the lateral walls 13 of the trough 9.

As described above, this oblique strip 21 is intended to provide deflection of the laser beam 3.

The heel 22 is delimited by two end edges 28 and 30 and by two side edges 31. The upper end edge 28 corresponds to the fold line 24.

The heel 22 has two parts, namely an upper part of generally trapezoidal shape and a rectangular lower part. The distance between the side edges of this rectangular lower part is slightly smaller than the distance between the ends 32 of the oblique folds 16 of the trough 9.

The side edges 31 of the upper part of the heel 22 are intended to mate with the upper surface of the oblique fold 16 of the trough 9; they each have a lug 33 whose function will be explained below.

An oblong void 34 is made at the centre of the heel 22. This void 34 occupies an optimum area in order in particular to reduce the weight of the said inserts 8 without reducing their structural strength.

Each insert 10 is secured within the trough 9 by inserting tenons 33 into the openings 17 made in the oblique lateral folds 16, which act as mortises (FIGS. 7 and 8).

This way of securing the inserts 10 on the trough 9 allows elastic fastening, of the clip-on type. It is thus possible for any damaged insert to be replaced easily and, especially, without requiring intervention on the adjacent inserts and without disassembling the slat from the conveyor.

Furthermore, this characteristic makes it possible where appropriate to assign the inserts 10 to all or to only some of the openings 17 of the oblique fold 16.

As represented in FIGS. 7 and 8, the inserts 10 are positioned in the trough 9 by force-fitting their tenons 33 into two mutually opposite openings 17 of the oblique folds 16 by applying vertical pressure.

As represented in FIG. 9, the inserts 10 contained in a trough 9 are then arranged parallel or virtually parallel to one another, but also parallel to the end wall 12 of the trough 9.

All the slats 8 juxtaposed in the same plane, and in particular all the inserts 10 contained in the said slats, form the depositing plane for the product to be cut. More precisely still, it is the upper edges 25 of the inserts 10 which form the depositing plane for the product.

The upper edges 25 of two juxtaposed inserts 10 are spaced apart by a uniform given distance d within the same slat; this distance d may, for example, be around 7 to 9 mm.

In the illustrated embodiment, this distance d separating two inserts 10 is equal to the distance e separating the plane of the support strip 20 and the plane of the heel 22. This characteristic provides deviation of the laser beam 3, preventing the beam 3 from passing through the slats 8 without deviation.

According to an alternative, this distance d may also be smaller than the distance e.

According to another embodiment of the invention illustrated by FIG. 10, the inserts 10 of the slats 8 are not provided with a lower heel.

Each insert 10 then takes the form of a folded thin sheet-metal plate comprising only the support strip 20, the free upper edge 25 of which forms a support element for the material 4 to be cut, and the oblique strip 21 for deflecting the laser beam 3. The two planar parts 20, 21 forming the support strip and the oblique strip are connected by the fold line 23.

As in the preceding embodiment, the side edges (not shown) of the oblique strip 21 of the inserts 10 have a profile allowing mating with the upper surface of the oblique folds 16 of the lateral walls 13 of the trough 9.

The side edges of the oblique strip 21 each likewise have a lug (not shown) for securing each insert 10 within the trough 9. This securing is achieved by inserting these lugs into openings or slots 17' made in the oblique lateral folds 16 of the lateral walls 13 of the trough 9. These openings 17' have an inclination which is substantially identical to that of the oblique strips 21 of the inserts 10.

It will be noted that, in this embodiment, a void making it possible to reduce the weight of the inserts and to provide better heat dissipation may be made in the oblique strip 21 of the inserts 10. Such a void is not represented in FIG. 10.

It will also be noted that various categories of troughs 9 whose openings 17, 17' are spaced apart to a greater or a lesser extent and inserts 10 in which the inclination of the oblique strip 21 is pronounced to a greater or lesser extent may be produced, which makes it possible to vary the distance between the upper edges 25 of the inserts 10.

Purely by way of example, the length of the upper strand 37 of the conveyor 1 between the two support rollers 5 may be around 4 m. The slats 8 may have a length of around 250 cm and a width of about 8 to 10 cm; the useful length of the said slat 8 may be around 240 cm.

To employ the machine illustrated in FIG. 1, the laser beam 3 is controlled as a function of the forward travel of the conveyor 1 in order to carry out cutting, according to a programmed pattern, of the product 4.

During this cutting operation, some waste 35 may potentially drop between the inserts 10, through the lower openings 18 of the troughs 9. This waste 35 is then collected in a recovery container 36 arranged directly under the depositing plane for the product, between the two strands 37, 38 of the conveyor 1.

Waste 35 which might possibly remain wedged within the slats 8, for example between the inserts 10, is extracted continuously as the table 1 moves around by a rotating brush 39 arranged at one of the ends of the endless conveyor. This cleaning operation is optimized owing to the longitudinal arrangement of the inserts 10.

When the table 1 is of the endless moving conveyor type, the cut material 4 is generally removed at one of the ends of the table. This operation is performed by a tool (not shown) provided with combs designed to be inserted between two adjacent inserts 10 of the slats 8 as the table moves around. The presence of a support strip 20 perpendicular to the depositing plane for the material 4 facilitates the positioning of these combs, and therefore the removal of the cut material.

The invention claimed is:

1. Slat for a laser beam cutting machine table, comprising:
   a. a trough which contains a plurality of spaced apart inserts arranged parallel or substantially parallel to one another, and:
   b. each insert in the trough takes the form of a folded thin sheet-metal plate which comprises: a first part having a free upper edge, a second oblique part for deflecting a laser beam having a direction of incidence perpendicular to a supporting plane at a distance from the supporting plane connected with the first part along a fold line which is distinct from the free upper edge and located at a distance from the free upper edge, the free upper edges of the first parts of the inserts defining the supporting plane for a product to be cut, and a third part on a plane parallel to said first part and oblique to said second oblique part and connected to said second part by a fold line;
   c. said first part of said sheet-metal plate having opposed main faces extending from said free upper edge substantially parallel to one another in a direction perpendicular to said supporting plane; and
   d. said second part of said sheet-metal plate being inclined by an oblique angle with respect to said direction perpendicular to said supporting plane.

2. Slat according to claim 1, having a distance e separating the plane of the support strip and the plane of the third part, and said distance e is greater than or equal to a distance d between two juxtaposed inserts.

3. Slat according to claim 1, having the inserts fastened to the support trough via tenons on the inserts capable of being inserted into openings within the support trough.

4. Slat according to claim 3, the slat comprising a trough having in particular two lateral walls whose upper ends are folded inward, each forming an oblique fold provided with a plurality of openings or slots distributed over the whole length of the said folds, which openings ensure that the inserts are distributed and accommodate lugs formed on each side edge of the said inserts, the assembly of the lugs in the corresponding openings taking place by clipping.

5. Slat according to claim 1, the insert having a material void a maximum area no greater than that which will maintain the rigidity of the said insert spanning the area of the void, which void makes it possible on the one hand to reduce the weight of each insert, and consequently that of the slat, and, on the other hand, makes it possible to achieve heat dissipation by allowing air or another agent to circulate within the said slats.

6. Slat according to claim 2, having the inserts fastened to the support trough via tenons on the inserts capable of being inserted into openings within the support trough.

7. Slat according to claim 1, the insert having a material void with a maximum area no greater than that which will maintain the rigidity of the said insert spanning the area of the void, which void makes it possible on the one hand to reduce the weight of each insert, and consequently that of the slat, and, on the other hand, makes it possible to achieve heat dissipation by allowing air or another agent to circulate within the said slats.

8. Slat according to claim 2, the insert having a material void with a maximum area no greater than that which will maintain the rigidity of the said insert spanning the area of the void, which void makes it possible on the one hand to reduce the weight of each insert, and consequently that of the slat, and, on the other hand, makes it possible to achieve heat dissipation by allowing air or another agent to circulate within the said slats.

9. Slat according to claim 3, the insert having a material void with a maximum area no greater than that which will maintain the rigidity of the said insert spanning the area of the void, which void makes it possible on the one hand to reduce the weight of each insert, and consequently that of the slat, and, on the other hand, makes it possible to achieve heat dissipation by allowing air or another agent to circulate within the said slats.

10. Slat according to claim 4, the insert having a material void with a maximum area no greater than that which will maintain the rigidity of the said insert spanning the area of the void, which void makes it possible on the one hand to reduce the weight of each insert, and consequently that of the slat, and, on the other hand, makes it possible to achieve heat dissipation by allowing air or another agent to circulate within the said slats.

* * * * *